United States Patent [19]

Hopkins

[11] Patent Number: 5,503,061
[45] Date of Patent: Apr. 2, 1996

[54] FOOD COOKING HOT AIR DISPENSING APPARATUS

[75] Inventor: Mark A. Hopkins, Laguna Niguel, Calif.

[73] Assignee: KRh Thermal Systems, South San Francisco, Calif.

[21] Appl. No.: 317,005

[22] Filed: Oct. 3, 1994

[51] Int. Cl.⁶ .................................................. A47J 37/04
[52] U.S. Cl. .......................... 99/357; 99/407; 99/409; 99/427; 99/476; 221/150 R; 221/150 A
[58] Field of Search .............................. 99/325, 451, 326, 99/331, DIG. 14, 330, 334, 357, 407, 409, 476, 427; 126/21 A; 219/400, 389, 679, 437, 725, 729; 221/150 A, 150 HC, 150 R

[56] References Cited

U.S. PATENT DOCUMENTS

| | | | |
|---|---|---|---|
| 3,653,541 | 4/1972 | Crum | 221/150 HC |
| 3,870,193 | 3/1975 | Schneider | 221/150 A |
| 4,438,683 | 3/1984 | Bartfield | 99/407 |
| 4,722,267 | 2/1988 | Galockin et al. | 219/437 |
| 4,748,902 | 6/1988 | Maurantonio | 99/326 |
| 4,838,455 | 6/1989 | Hoeberigs | 99/357 |
| 5,097,754 | 3/1992 | Covington et al. | 219/400 |
| 5,134,927 | 8/1992 | McCarthy, III et al. | 126/21 A |
| 5,203,253 | 4/1993 | Covington et al. | 99/357 |
| 5,205,255 | 4/1993 | Wells et al. | 99/476 |
| 5,210,387 | 5/1993 | Smith et al. | 219/10.55 |
| 5,245,150 | 9/1993 | Grandi | 219/753 |
| 5,400,699 | 3/1995 | Cailbault | 99/357 |

Primary Examiner—Timothy F. Simone
Attorney, Agent, or Firm—Skjerven, Morrill, MacPherson, Franklin & Friel; Thomas S. MacDonald

[57] ABSTRACT

An air dispensing apparatus for providing an oscillating mass of hot air to facilitate crisping and browning of a trayed foodstuff includes an oscillating shoe extending from an air introduction chamber having a blower and a volute duct exit and an insulating shaft rotatively connecting an inner end of the shoe to the volute duct exit. The shaft includes a square cross-section portion which transfers torque from a crank-driven oscillator link directly to a matching square cross-section bore or aperture in a side wall of the shoe inner end. A hitch pin at the opposite shaft end prevents axial shaft movement. The insulating shaft eliminates arcing between the volute and the shoe. The invention also includes an improved separator screen for grounding a perforated plate to the air introduction chamber and an overall housing to prevent arcing therebetween.

9 Claims, 5 Drawing Sheets

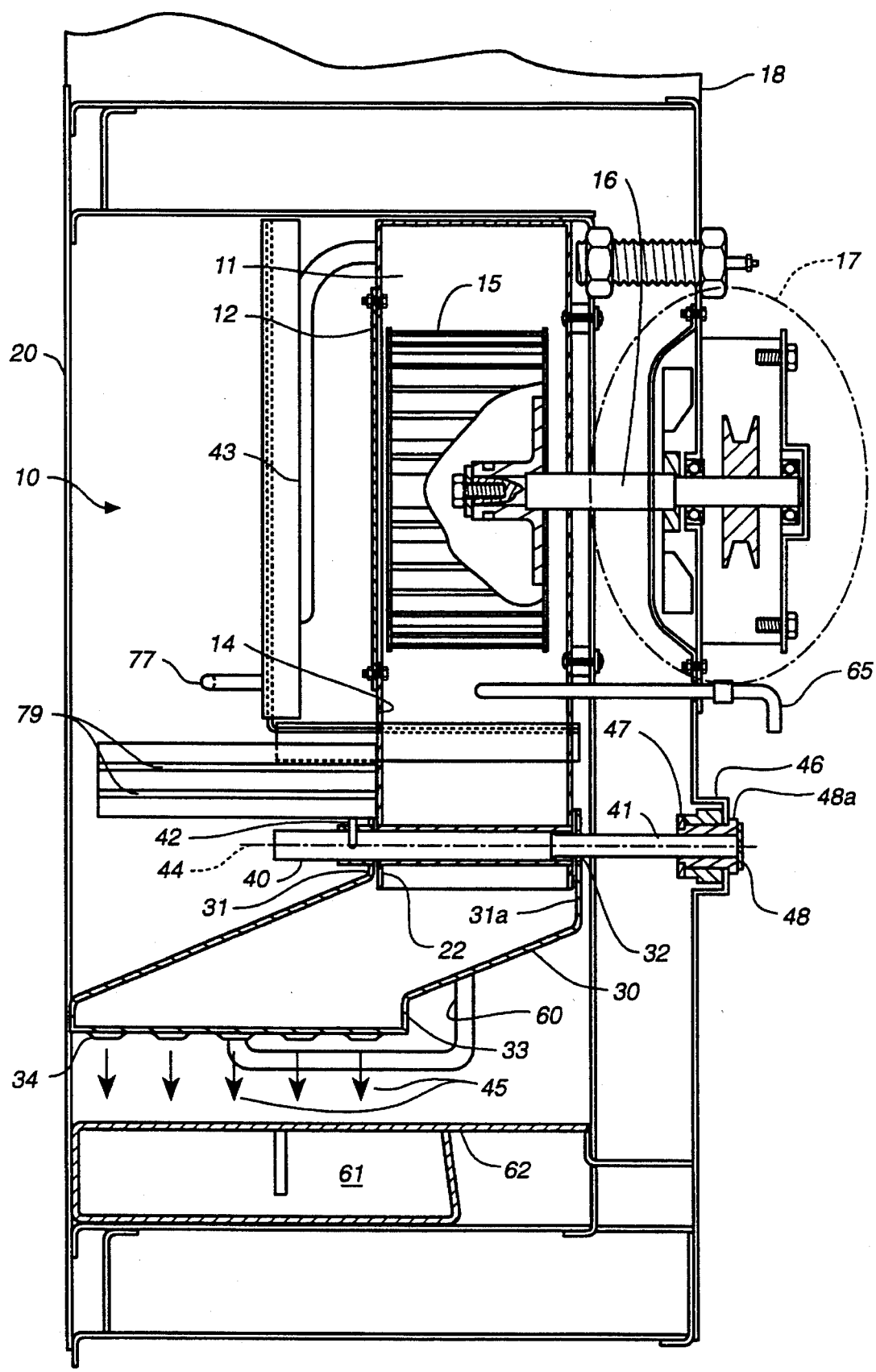
FIG._1

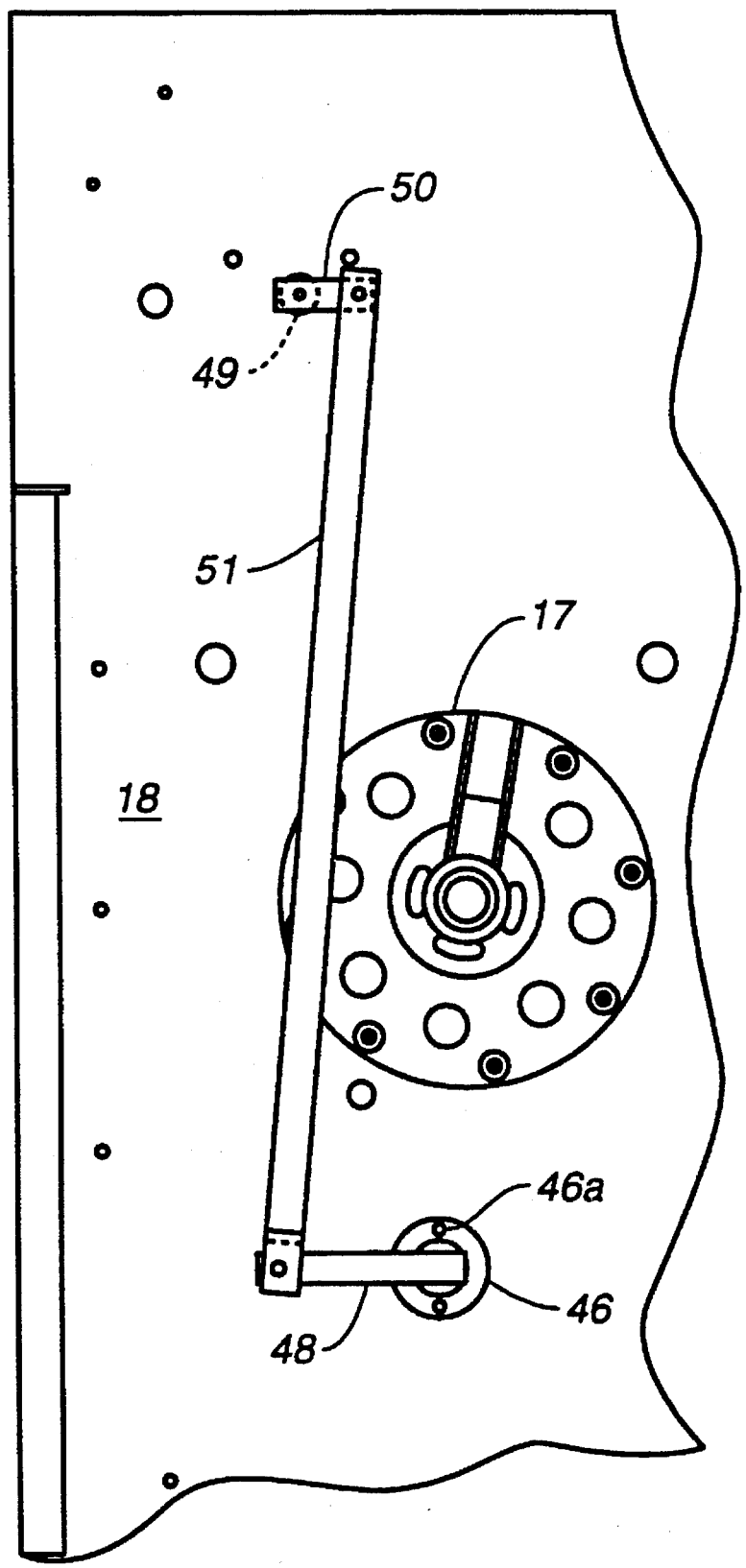
FIG._2

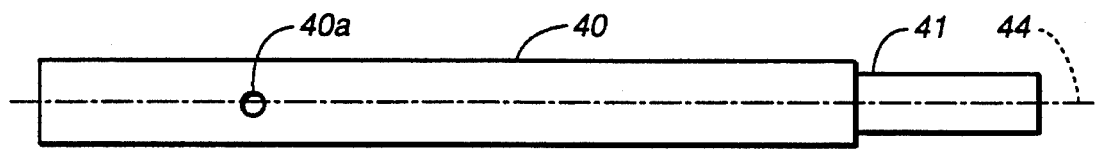
FIG._3
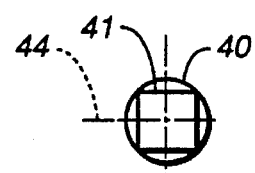
FIG._4
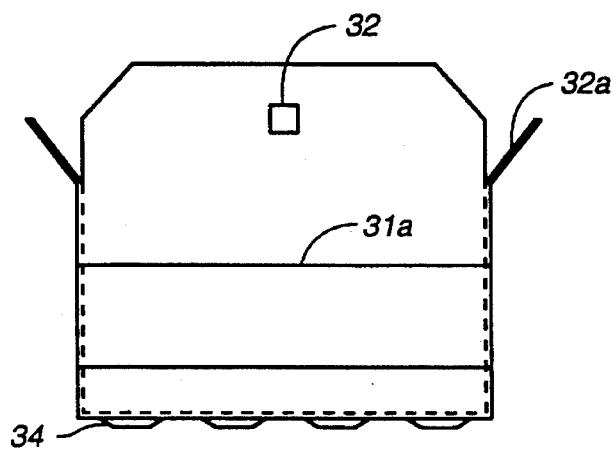
FIG._5
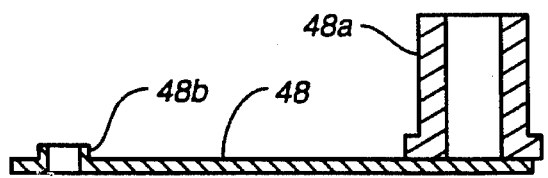
FIG._6
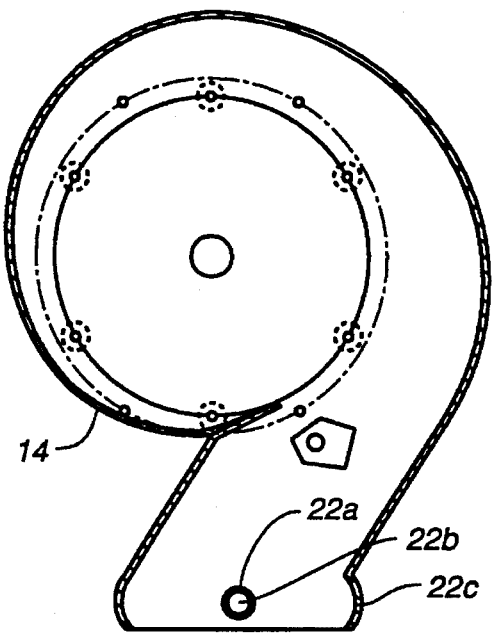
FIG._7

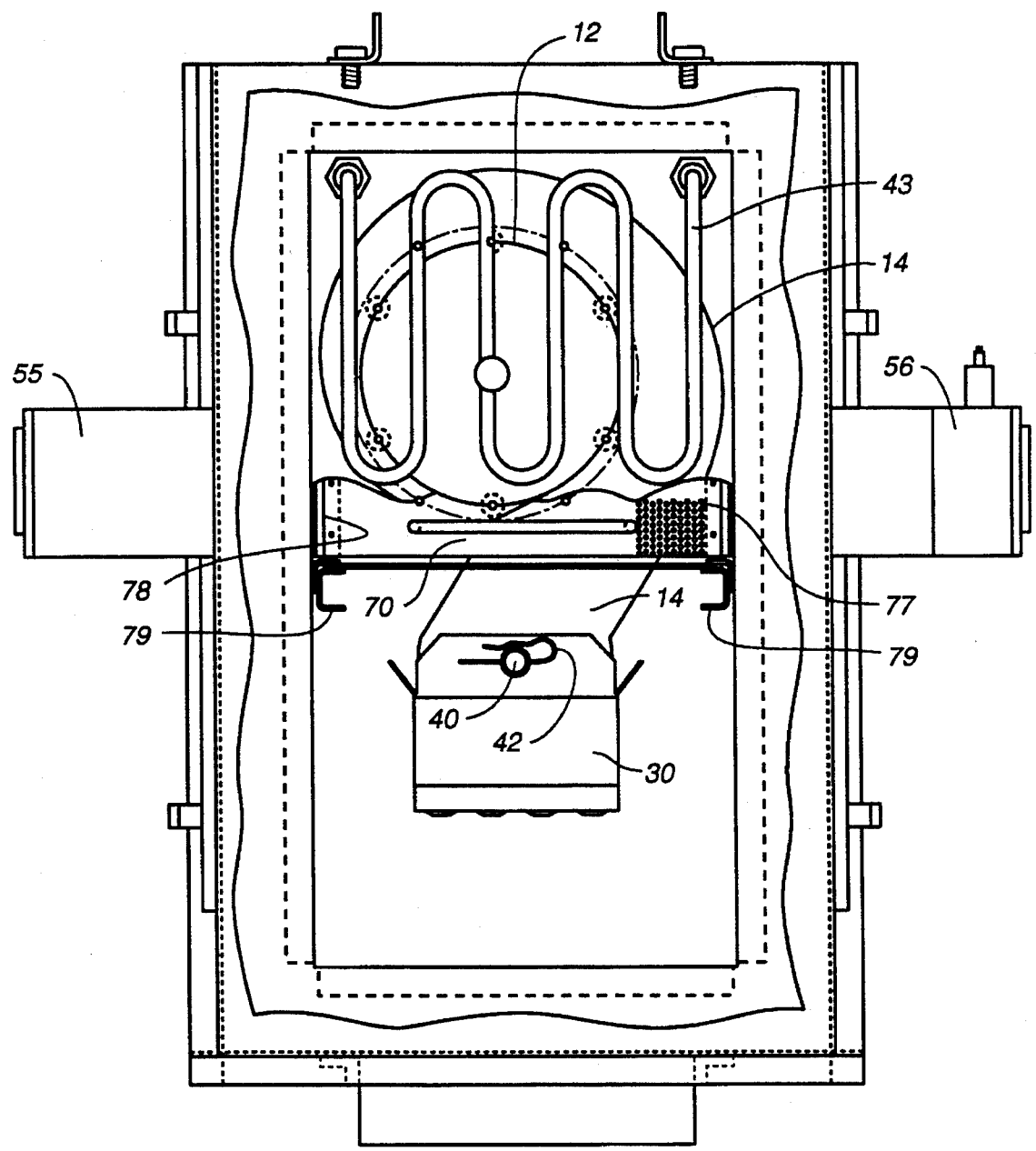
FIG._8

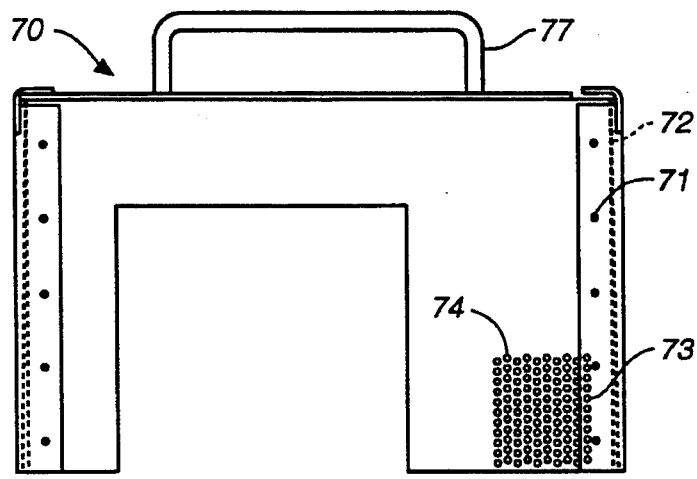
FIG._10
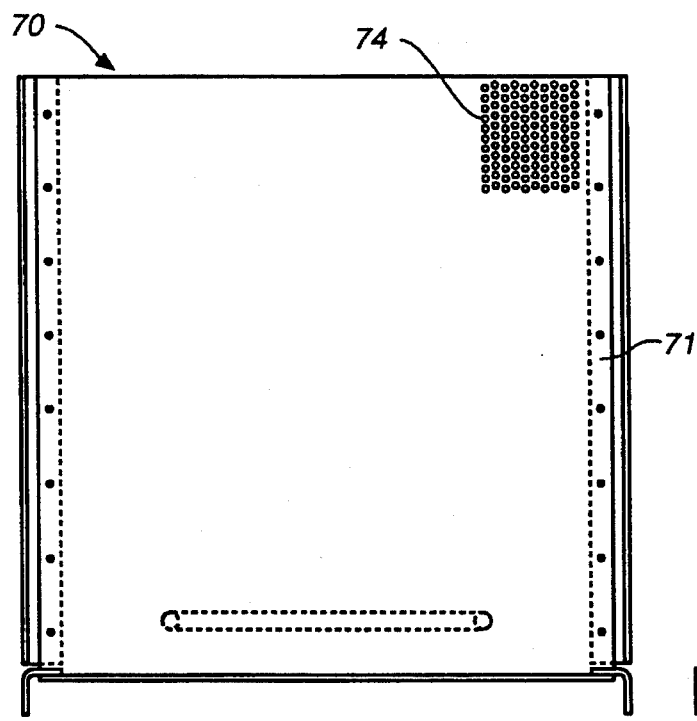
FIG._9
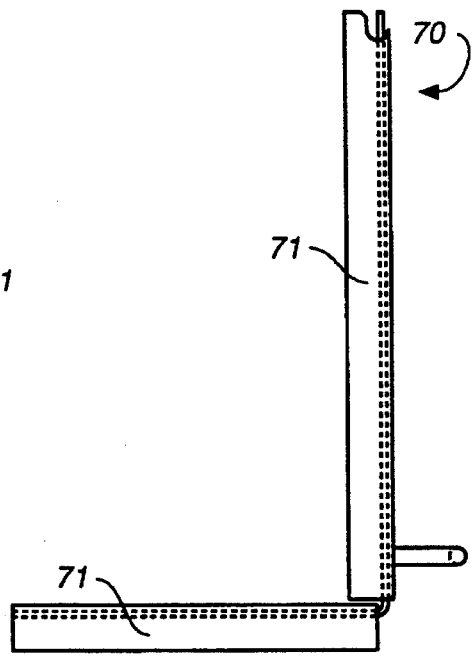
FIG._11

5,503,061

FOOD COOKING HOT AIR DISPENSING APPARATUS

FIELD OF THE INVENTION

The invention relates to improvements in a hot air dispensing apparatus employable in a hot meal vending device. More particularly the invention is directed to an improved air dispensing apparatus directing blown air in an oscillatory manner so as to impinge upon the surface of a food product to be heated and to an improved perforated plate for preventing transfer of microwave energy from a cooking compartment to the air dispensing apparatus.

BACKGROUND OF THE INVENTION

U.S. Pat. No. 5,210,387 describes a vending machine for hot foods including an oven cabinet divided by a perforated plate to prevent transfer of microwave energy from a cooking compartment to hot air conditioning compartment, the latter utilized to facilitate crisping and browning of the food (normally in a tray) to provide a desired surface texture. The patent in FIGS. 4, 11 and 12 discloses an oscillating, crank-driven air dispensing apparatus pivoted to a duct plenum.

SUMMARY OF THE INVENTION

The air dispensing apparatus of the invention includes an air introduction chamber including a blower and a discharge volute duct. An oscillatory shoe extends from the volute exit and is keyway connected to a solid transverse shaft. Oscillation of the shoe is provided by a crank-driven oscillation link rotatable in bushing provided in a side wall of a housing for the chamber. The keyway connection is provided by a square cross-section portion of the shaft transferring torque directly to a transverse key opening in a side wall of the shoe inlet end, the opening having a interfitting matching square cross-section. A hitch pin extends transversely through a bore in a shaft end opposite the shaft bushing end, to prevent axial movement of the shaft with respect to the chamber. Further, the apparatus does not absorb microwave energy or cause arcing between the components of the apparatus. In another aspect of the invention, a separator screen including a perforated plate having solid metal edges at the plate peripheries grounds the plate to the chamber structure to essentially prevent arcing between the plate and that structure.

BRIEF DESCRIPTION OF THE DRAWINGS

FIG. 1 is a cutaway partial cross-sectional view of the air dispensing apparatus and separator screen.

FIG. 2 is a side view of the oscillator linkage exterior of the apparatus housing for driving the oscillatory shaft and oscillatory shoe.

FIG. 3 a perspective side view of the oscillatory shaft.

FIG. 4 is a right-hand end view of the shaft.

FIG. 5 is an end view of the oscillatory shoe showing the traverse key opening.

FIG. 6 is a side cross-sectional view of the oscillating link.

FIG. 7 is a side cross-sectional view of the volute duct per se.

FIG. 8 is a cutaway side view of the apparatus chamber showing the placement of the separator screen.

FIG. 9 is a rear side view of the screen.

FIG. 10 is a top view of the screen.

FIG. 11 is a side edge view of the screen.

DETAILED DESCRIPTION

With reference to FIG. 1 the air dispensing apparatus 10 of the invention includes an air introduction chamber 11 having an air inlet 12 and volute duct 14. Air is introduced into chamber 11 and dispense by rotation of a blower 15 driven by shaft 16 as known in the prior art by a pulley/bearing circled arrangement 17 connected to an exterior housing wall 18 of a housing 20. An upper end 31 of an oscillatory shoe 30 is connected to the exit end 22 of volute duct 14 by a shaft 40 having a linear portion 41 of square or other non-circular cross-section forming a torque transferring key portion. The outer upper end 31a of the shoe 30 includes an opening 32 of a matching square or other non-circular contour which interfits with the contour of shaft linear portion 41, permitting the shaft to be oscillated by oscillation of the torquing shaft. The shaft 40 is axially held in the volute duct and shoe inlet by a hitch pin 42. Oscillation of the shaft 40 oscillates the shoe in a predetermined arc of about from −30° to about +30° about the vertical axis 44 of the shaft so that the shoe exit end 33 and a series (preferably eighteen in a preferred embodiment) of nozzles 34 follow a fan-like arc out the rear and then out the front of plane of the FIG. 1 sheet of drawings. The result is a downward flow (arrows 45) of hot air (heated by a suitable resistance heater rod 43 (FIG. 8) against a food-containing tray in volume 61 below a wire tray guide 62. The tray is seen in the '387 patent. A temperature probe 65 provides closed-loop feedback for oven temperature control.

The shaft 40 preferably constructed of solid Rulon® 488 plastic is rotatable in a bushing 46, snap ring 47 and oscillator link 48 connected to a motor-driven shaft 49, and intermediate pivotable links 50 and 51. The Rulon plastic shaft acts as an insulator between the volute duct and the shoe, thus preventing arcing of flux across gaps in metallic surfaces of these components. The oscillator link 48 includes a collar 48a (FIG. 6) to which the square right hand end of the shaft is fit into the female square of the oscillating link. At room temperature, the shaft square loosely fits into the female square but at operating temperature, typically 430° F. is in a force fit due to thermal expansion of the plastic shaft. The shaft is also supported by the volute duct. The shaft then supports the shoe. The other side of the shoe opposite side 31a has a circular bore accommodating the shaft circumference. The shaft and collar 48a are rotatable/oscillatable in bushing 46 which is affixed to wall 18 by screws 46a. The outer end of link 48 includes a self-clinching nut 48b for pivot connection to link 51. As seen in FIG. 5 the shoe inlet includes flared edges 32a which function to minimize loss of hot air exiting the volute end 22 into the shoe 30 when the shoe is oscillating. These edges tend to spacedly rotate closely to curved bottom edges 22c of the volute (FIG. 8).

FIG. 7 is a cross-sectional side view of the volute duct 14 particular housing the volute bore 22a having a central axis 22b around which the shoe 30 oscillates. Curved portions 22c assist in preventing most of the hot air from exiting the plenum end other than into the shoe inlet.

FIG. 8 shows more clearly the shape of the hand-removable hitch pin 42 inserted transversely in a bore 40a (FIG. 3) of the shaft 40 to prevent shaft axial movement. It also illustrates the positioning of separation screen 70 in the chamber housing.

As seen in FIGS. 9–11, solid metal sides in the form of 90° angle linear members 71 extend over the peripheral edges 73 of the perforated screen and over frame like outer portions 72 covering the outermost ones of the perforations 74. The angle members and screen are typically made of 16 GA (0.060" thick) CRES steel while the screen is perforated with 0.125" apertures at 0.187" centers, providing 40% of open area. A handle 77 preferably of 0.250" CRES bar stock is welded to the front surface of the separator screen 70 to manipulate the screen into the screen guides 79 on the sides of an opening 78 parallel to the air inlet opening 12 of the chamber 11. The solid sides of the angles which preferably are welded to the screen, are sized to ground the screen to the housing 20 which also includes a microwave oven, eliminating any arcing between the perforated screen and to the oven housing. The sides are preferably welded to the screen at no more than )b 1" spacing, so as to preclude arcing between the sides and screen. FIG. 8 also illustrates the location of a pair of magnetrons 55 and 56 which are connected to wave guides 60 formed in side walls of the oven included in housing 20 and as shown in the '387 patent FIG. 2.

The above description of the preferred embodiment of this invention is intended to be illustrative and not limiting. Other embodiments of this invention will be obvious to those skilled in the art in view of the above disclosure.

I claim:

1. An air dispensing apparatus comprising an air introduction chamber including a volute duct exit;

an oscillatory shoe extending from said volute duct exit and rotatable with respect to said volute duct exit;

means for connecting and rotating said shoe with respect to said volute duct exit; and wherein said means comprises a rotation shaft extending transversely through said volute duct exit and an inlet end of said shoe, said shaft including a key portion for transferring torque from said shaft key portion to a transverse key opening in said shoe inlet end, and means for axially holding said shaft with respect to said volute duct exit and shoe inlet end.

2. The apparatus of claim 1 wherein said key portion is a square cross-section of said shaft extending over a linear portion of said shaft and said transverse key opening is of a matching square cross-section.

3. The apparatus of claim 1 wherein said means for axially holding said shaft comprises a hitch pin removably extending transversely through said shaft exteriorly of said air introduction chamber.

4. The apparatus of claim 1 further including an apparatus housing, said air introduction chamber being fixed within said housing and wherein said shaft is rotatively mounted on a side wall of said housing.

5. The apparatus of claim 4 further including means for oscillating said shaft over a predetermined travel arc, said means for oscillating including a bushing in said housing side wall, an oscillator arm rotatable in said bushing and fixedly connected to said rotation shaft, and means for oscillating said oscillator arm.

6. The apparatus of claim 4 further including a separator screen extending between said air introduction chamber and a shoe outlet end, said separator screen including a perforated metal plate having solid metal edges extending around peripheral edges of said plate and over a peripheral frame portion of said plate and grounded to said housing to essentially eliminate arcing between said plate and said air introduction chamber.

7. The apparatus of claim 1 wherein said shaft is a plastic shaft such that arcing is prevented between said volute duct exit and said shoe inlet end.

8. The apparatus of claim 7 wherein said plastic shaft is constructed of Rulon plastic which at apparatus operating temperature said key portion is expanded into a force fit with said key opening.

9. The apparatus of claim 1 further including a separator screen extending between said air introduction chamber and a shoe outlet end, said separator screen including a perforated metal plate having solid metal edges extending around a peripheral edge of said plate and over a peripheral frame portion of said plate and grounded to said air introduction chamber to essentially eliminate arcing between said plate and said air introduction chamber.

\* \* \* \* \*